US00RE35134E

United States Patent [19]

Mizuno et al.

[11] E Patent Number: Re. 35,134

[45] Reissued Date of Patent: Dec. 26, 1995

[54] RESISTANCE ADJUSTING TYPE HEATER AND CATALYTIC CONVERTER

[75] Inventors: Hiroshige Mizuno, Tajimi; Fumio Abe, Handa; Takashi Harada, Nagoya, all of Japan

[73] Assignee: NGK Insulators, Ltd., Japan

[21] Appl. No.: 137,763

[22] Filed: Oct. 19, 1993

Related U.S. Patent Documents

Reissue of:

[64] Patent No.: 5,063,029
Issued: Nov. 5, 1991
Appl. No.: 545,509
Filed: Jun. 29, 1990

[30] Foreign Application Priority Data

Apr. 12, 1990 [JP] Japan ..... 2-96866

[51] Int. Cl.[6] ..... F01N 3/10; B01D 53/38; H05B 3/10

[52] U.S. Cl. ..... 422/175; 422/174; 422/177; 422/179; 422/180; 60/300; 219/552; 55/DIG. 30

[58] Field of Search ..... 422/174, 177, 422/179, 180, 175; 60/300; 219/552, 553, 505; 338/195, 223, 333, 334; 392/379, 485; 55/DIG. 30

[56] References Cited

U.S. PATENT DOCUMENTS

| | | | |
|---|---|---|---|
| 3,768,982 | 10/1973 | Kitzner et al. | 422/174 |
| 3,770,389 | 10/1973 | Kitzner et al. | 60/300 X |
| 4,322,387 | 3/1982 | Virk et al. | 422/174 |
| 4,345,430 | 8/1982 | Pallo et al. | 60/282 |
| 4,420,316 | 12/1983 | Frost et al. | 55/523 |
| 4,505,107 | 3/1985 | Yamaguchi et al. | 60/303 |
| 4,758,272 | 7/1988 | Pierotti et al. | 75/246 |
| 4,972,197 | 11/1990 | McCauley et al. | 343/704 |
| 4,976,929 | 12/1990 | Cornelison et al. | 422/174 |
| 5,146,743 | 9/1992 | Maus et al. | 60/274 |

FOREIGN PATENT DOCUMENTS

| | | | |
|---|---|---|---|
| 2333092 | 1/1975 | Germany | 60/300 |
| 1492929 | 11/1977 | United Kingdom . | |
| WO89/10471 | 2/1989 | WIPO . | |

OTHER PUBLICATIONS

Heimrich, M. J., Experimentation to Determine the Feasibility of Air Injection on an Electrically–Heated Catalyst for Reducing Cold–Start Benzene Emissions from Gasoline Vehicles, Advisory Committee for Research, Southwest Research Institute, San Antonio, Tex., Jan. 1990.

*Primary Examiner*—Timothy M. McMahon
*Attorney, Agent, or Firm*—Parkhurst, Wendel & Rossi

[57] ABSTRACT

A resistance adjusting type heater including a honeycomb structure having a large number of passages, at last two electrodes for energizing the honeycomb structure, and a resistance adjusting mechanism such as a slit provided between the electrodes to heat the gas flowing through the passages formed in the honeycomb structure. A catalytic converter includes a main monolith catalyst and the above-described heater placed adjacent to and upstream of the main monolith catalyst. A catalytic converter includes a honeycomb structure having a large number of passages, a catalyst carried on the honeycomb structure, at least two electrodes for energizing the honeycomb structure, and a resistance adjusting mechanism provided between the electrodes. A catalytic converter includes a main monolith catalyst, and a heater placed adjacent to and upstream of the main monolith catalyst. The heater includes a honeycomb structure having a large number of passages, a catalyst carried on the honeycomb structure, at least two electrodes for energizing the honeycomb structure, and a resistance adjusting mechanism provided between the electrodes.

14 Claims, 7 Drawing Sheets

RESISTANCE ADJUSTING TYPE HEATER AND CATALYTIC CONVERTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a heater and a catalytic converter both having a resistance adjusting function and employing a honeycomb structure.

Honeycomb heaters of the above-described type can be employed as heaters for domestic use, such as hot air heaters, or as industrial heaters, such as preheaters used for control of automobile exhaust emission. The above-described catalytic converters can be applied for use in automobile exhaust emission control.

2. Description of the Related Art

Conventionally, porous ceramic honeycomb structures have been employed as catalysts or carriers for catalysts for removing, for example, nitrogen oxides, carbon monoxide and hydrocarbons present in the exhaust gas of internal combustion engines, such as automobiles, or filters for removing fine particles.

Whereas porous ceramic honeycomb structures continue to be a popular and useful material in such environments, there has been a desire to develop materials exhibiting greater mechanical strength and thermal resistance in hostile environments.

Apart from the above honeycomb structures, as restriction of exhaust emission has been intensified, there has been a demand for development of heaters for use in automobile exhaust emission control.

Honeycomb structures have been proposed in, for example, U.S. Pat. No. 4,758,272, Japanese Utility Model Laid-Open No. 67609/1988 and U.K. Patent 1492929.

The honeycomb structure disclosed in U.S. Pat. No. 4,758,272 has a composition essentially consisting, as analyzed in weight percent, of 5 to 50% Al, 30 to 90% Fe, 0 to 10% Sn, 0 to 10% Cu, 0 to 10% Cr and no more than 1% Mg and/or Ca. This honeycomb structure has a porosity of 25 to 75% and a predetermined cell density, and is used as a diesel particulate filter.

However, U.S. Pat. No. 4,758,272 does not disclose the use of the above-described honeycomb structure as a heater or a catalytic converter.

U.K. Patent 1492929 discloses the use of a foil type metal honeycomb structure in a catalyst for use in automobile exhaust emission control, This honeycomb structure comprises a metal substrate produced by winding, together with a fiat plate, a mechanically deformed, corrugated fiat plate. This metal substrate has an oxide aluminum film formed on the surface thereof by the oxidation process. The catalyst for use in automobile exhaust emission control is manufactured by placing a high surface area oxide, such as alumina, on the oxide aluminum film of the metal substrate and by supporting a noble metal on the high surface area oxide.

Japanese Utility Model Laid-Open No. 67609/1988 discloses the use as a preheater of an electrically conductable metal monolith catalyst comprising a metal support and alumina coated thereon.

In the foil-type metal honeycomb structure disclosed in U.K. Patent 1492929, however, the metal substrate with a coating formed thereon cannot be closely adhered to a catalyst layer because of its low porosity, and a ceramic catalyst readily peels off the metal substrate due to a difference in the thermal expansion between the ceramic catalyst and the metal substrate. Furthermore, a telescope phenomenon readily occurs during the run cycle in which a metal-to-metal joint breaks and the metal substrate is deformed in such a manner that it protrudes in the direction of the flow of gas. This may disturb safe running of the vehicle. Furthermore, in the manufacture of the foil type metal honeycomb, yield of the rolling process is low, inviting high production costs. In the preheater proposed in Japanese Utility Model Laid-Open No. 67609/1988, coated alumina readily peels off a metal support due to a difference in thermal expansion between alumina and the metal support. Furthermore, a metal-to-metal joint of the metal substrate breaks during the operation, generating an electrically insulating portion and, hence, non-uniform flow of current and non-uniform heating.

The preheater disclosed in Japanese Utility Model Laid-Open No. 67609/1988 is constructed such that a current is supplied between the inner periphery and the outer periphery of the foil type metal honeycomb structure to generate heat. However, the preheater is not arranged such that it has an adjusted resistance (that is, the material, dimension and rib thickness of the honeycomb structure define the resistance but a desired resistance cannot be adjusted), and therefore exhibits insufficient temperature rising characteristics. Furthermore, since the electrodes are provided on the inner peripheral portion of the preheater, the central portion thereof does not act as a catalyst and pressure loss may be generated. Furthermore, the electrodes readily break due to the flow of gas.

SUMMARY OF THE INVENTION

Accordingly, an object of the present invention is to provide a resistance adjusting type heater and catalytic converter which eliminate the aforementioned problems of the prior techniques.

To achieve the above object, the present invention provides a resistance adjusting type heater which comprises a honeycomb structure having a large number of passages, at least two electrodes for energizing the honeycomb structure, and a resistance adjusting means provided between the electrodes to heat the gas flow through the passages formed in the honeycomb structure.

The present invention further provides a catalytic converter which comprises a main monolith catalyst and the above-described heater placed adjacent to and upstream of the main monolith catalyst. The present invention further provides a catalytic converter which comprises a honeycomb structure having a large number of passages, a catalyst carried on the honeycomb structure, at least two electrodes for energizing the honeycomb structure, and a resistance adjusting means provided between the electrodes.

The present invention further provides a catalytic converter which comprises a main monolith catalyst and a heater placed adjacent to and upstream of the main monolith catalyst. The heater includes a honeycomb structure having a large number of passages, a catalyst carried on the honeycomb structure, at least two electrodes for energizing the honeycomb structure, and a resistance adjusting means provided between the electrodes.

In a preferred form, the honeycomb structure is manufactured by extruding powders into a honeycomb configuration and by sintering the shaped body.

DETAILED DESCRIPTION OF THE INVENTION

Figure 1:
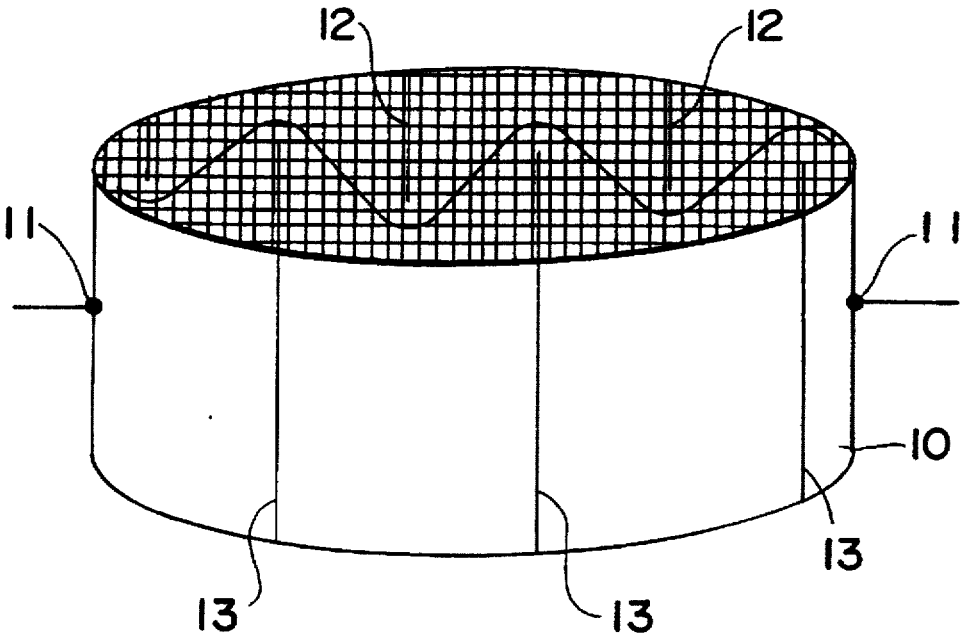
FIG. 1 to FIG. 5 are perspective views showing examples of heaters or catalytic converters according to the present invention.

The present invention discloses a resistance adjusting type heater which comprises a honeycomb structure having a large number of passages, at least two electrodes for energizing the honeycomb structure, and a resistance adjusting means provided between the electrodes. That is, the heat generation characteristics of the heater can be controlled by adjusting a resistance thereof, so that the heater can be heated locally or in its entirety depending on its application.

In the catalytic converter of the present invention, heat generation characteristics thereof can be controlled as in the case of the above heater. Thus, the catalytic converter can be heated locally or in its entirety depending on its application.

The honeycomb structure employed in the present invention may be produced by extruding powders into a honeycomb configuration and by sintering the formed body. That is, the honeycomb structure may be the one manufactured using the powder metallurgy and extrusion. Therefore, the manufacture process is simple and low production costs can be attained.

The use of a honeycomb structure (a unitary body) manufactured by using powders in the heater and catalytic converter contemplated in the present invention eliminates the telescope phenomenon, and achieves uniform heating.

In the resistance adjusting type heater contemplated in the present invention, coating of a heat-resistant metal oxide, such as $Al_2O_3$ or $Cr_2O_3$, on the surface of the cell walls and that of the pores of a metal honeycomb structure is preferred to enhance resistance to heat, oxidation and corrosion.

Whereas any material, ceramic or metal, capable of generating heat when energized can be used as the material of the honeycomb structure which is the basic body of the invention, the use of metals enhances the mechanical strength. Examples of such metals include stainless steel and those having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. Foil type metal honeycomb structures may also be employed.

The honeycomb structure employed in the present invention may or may not be porous. In the case where a catalyst is earned on the honeycomb structure, however, a porous honeycomb structure is preferred because it is closely adhered to a catalyst layer and does not cause peeling off of the catalyst due to a difference in thermal expansion the honeycomb structure and the catalyst Even if a non-porous honeycomb structure is employed, since the heater of this invention has a resistance adjusting means which may be a slit, a thermal stress my be reduced while the possibility of crack occurrence may be decreased.

The method of manufacturing the metal honeycomb structure which can be employed in the present invention will now be exemplified.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture, and that mixture is then formed into a shape of a desired honeycomb configuration by extrusion.

When the metal powder mixture is blended into an organic binder and water prior to the addition of water, an antioxidant, such as oleic acid, my be added to the metal powder mixture. Alternatively, powders of metals which are subjected to an anti-oxidation process my be employed.

Next, the formed honeycomb body is fired in a non-oxidizing atmosphere at a temperature ranging between 1000° and 1450° C. During the sintering in the non-oxidizing atmosphere containing hydrogen, the organic binder is decomposed and thereby removed with the aid of Fe or the like which acts as a catalyst, and a good sintered body can therefore be obtained, Sintering at a temperature lower than 1000° C. achieves no sintermg. Sintering conducted at a temperature higher than 1450° C. causes deformation of the resulting sintered body.

Preferably, a heat-resistant metal oxide is then coated on the surface of the cell walls and that of the pores of the obtained sintered body by any of the following methods wherein:

(1) the metal honeycomb structure (the sintered body) is subjected to the heat-treatment in an oxidizing atmosphere at a temperature ranging between 700° to 1100° C.;

(2) Al or the like is plated (e.g., vapor plating) on the surface of the cell walls and that of the pores of the sintered body and that sintered body is then subjected to heat-treatment in an oxidizing atmosphere at a temperature between 700° and 1100° C.;

(3) the sintered body is dipped into a molten metal, such as Al, and that sintered body is then subjected to the heat-treatment in an oxidizing atmosphere at a temperature between 700° and 1100° C.;

(4) alumina sol or the like is coated on the surface of the cell walls and that of the pores of the sintered body and that sintered body is then subjected to the heat-treatment in an oxidizing atmosphere at a temperature between 700° and 1100° C.

To enhance resistance to heat and oxidation, heat-treatment conducted at a temperature ranging between 900° and 1100° C. is preferred.

Next, a resistance adjusting means of any form is provided on the obtained honeycomb structure between the electrodes thereof, which will be described later.

The resistance adjusting means provided on the honeycomb structure may take on any of the following forms:

(1) a slit or slits of any length, formed in any direction at any position;

(2) variations in the length of cell walls in the axial direction of the passages;

(3) variations in the thickness (wall thickness) of the cell walls of the honeycomb structure or variations in the cell density of the honeycomb structure; and (4) a slit or slits formed in the cell wall (rib) of the honeycomb structure.

Examples of the resistance adjusting means are typically shown in FIGS. 1 to 9). In the drawings, each arrow indicates current flow.

The resistance adjusting type heater of the present invention is produced by providing electrodes on the outer periphery or inside of the metal honeycomb structure obtained in the manner described above by means of brazing or welding.

In the present invention, the electrode means a general term of a terminal for energizing the heater and includes a terminal which is made by joining an outer periphery of the heater to a casing, or an earth, etc.

In the thus-obtained metal honeycomb structure designed for use as a heater, the resistance thereof will be preferably held between 0.001 Ω and 0.5 Ω.

Also, a heater or catalytic converter can be produced by placing a catalyst on the surface of the obtained metal honeycomb structure. In such heater or catalytic converter, heat is generated due to reaction (oxidation) of the exhaust gas.

The catalyst supported on the surface of the metal honeycomb structure is made of a carrier having a high surface area and a catalytic activating material supported on the carrier. Typical examples of the carriers having a high surface area include $\gamma$-$Al_2O_3$, $TiO_2$, $SiO_2$-$Al_2O_3$ and perovskite. Examples of the catalytic activating material include noble metals, such as Pt, Pd and Rh, and base metals, such as Cu, Ni, Cr and Co. The preferred catalyst is the one in which from 10 to 100 g/ft$^3$ Pt or Pd is loaded on the carrier made of $\gamma$-$Al_2O_3$.

Whereas the honeycomb structure employed in the present invention may have any configuration, it is desirable that the cell density ranges from 6 to 1500 cells-in$^2$ (0.9 to 233 cells/cm$^2$) with a wall thickness ranging from 50 to 2000 82 m.

As stated above, the honeycomb structure employed in the present invention may or may not be porous and my have any porosity. However, to achieve sufficient mechanical strength and resistance to oxidation and corrosion, the porosity of the metal honeycomb structure will preferably be held between 0 and 50% by volume with most preferable porosity being less than 25% by volume. In a honeycomb structure designed to carry a catalyst thereon, the porosity will be held 5% or above to ensure strong adhesion between the honeycomb structure and catalyst layers.

The term, "honeycomb structure" is employed in this application to refer to an integral body having a large number of passages partitioned by the walls. The passages may have any cross-sectional form (cell shape), e.g., a circular, polygonal or corrugated form.

The present invention will further be illustrated in the following examples which are intended to be illustrative, but not limiting, of this invention.

EXAMPLE 1

Fe powder, Fe-Al powder (Al: 50 wt %) and Fe-Cr powder (Cr: 50 wt %), having average particle sizes of 10, 20 and 22 μm, were mixed to prepare a mixture having a composition of Fe-22Cr-5Al (% by weight), and the obtained mixture was then blended into an organic binder (methyl cellulose), an antioxidant (oleic acid) and water to produce a readily formable body. That body was formed into a square cell honeycomb structure having a rib thickness of 4 mil and a cell density of 300 cpi$^2$ by extrusion. The extruded honeycomb structure was dried and fired in an $H_2$ atmosphere at 1300° C. Thereafter, the obtained honeycomb structure was subjected to the heat-treatment in an atmosphere at 1000° C. The obtained honeycomb structure had a porosity of 22% by volume and an average pore diameter of 5 μm.

Two electrodes 11 were provided on the outer wall of the thus-obtained honeycomb structure having an outer diameter of 90 mmϕ and a length of 15 mm, as shown in FIG. 1. Also, six slits 12 having a length of 70 mm were formed in the honeycomb structure in the axial direction of the passages (the slits provided at the two ends had a length of 50 mm) at intervals of seven cells (about 10 mm). Zirconia type heat-resistant inorganic adhesive was idled in an outer peripheral portion 13 of each slit 12 to form an insulating portion.

EXAMPLE 2

$\gamma$-$Al_2O_3$ was coated on the honeycomb structure obtained in Example 1, and each 20 g/ft$^3$ Pt and Pd were then loaded on this $\gamma$-$Al_2O_3$. Thereafter, the whole honeycomb structure was fired at 600° C., to obtain a honeycomb structure with a catalyst carried thereon. Thereafter, the electrodes 11 were provided on this honeycomb structure with a catalyst in the same manner as that of Example 1.

EXAMPLE 3

Figure 2:
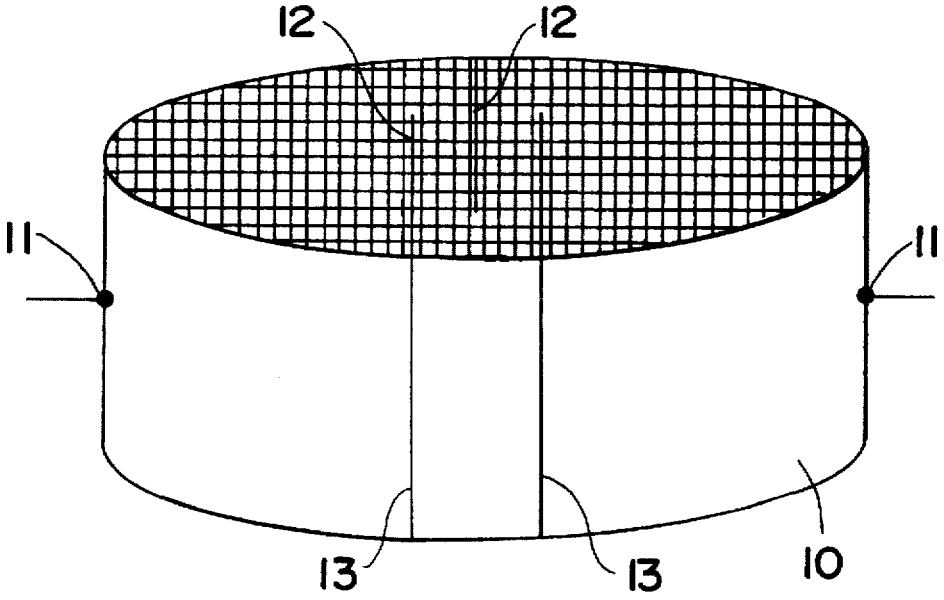

Three slits 12 were formed in the central portion of the honeycomb structure obtained in the same manner as that of Example 1, as shown in FIG. 2. The slits 12 were separated by intervals of three cells which were about 4.5 mm,, The electrodes 11 were provided in the same manner as that of Example 1.

EXAMPLE 4

Figure 3:
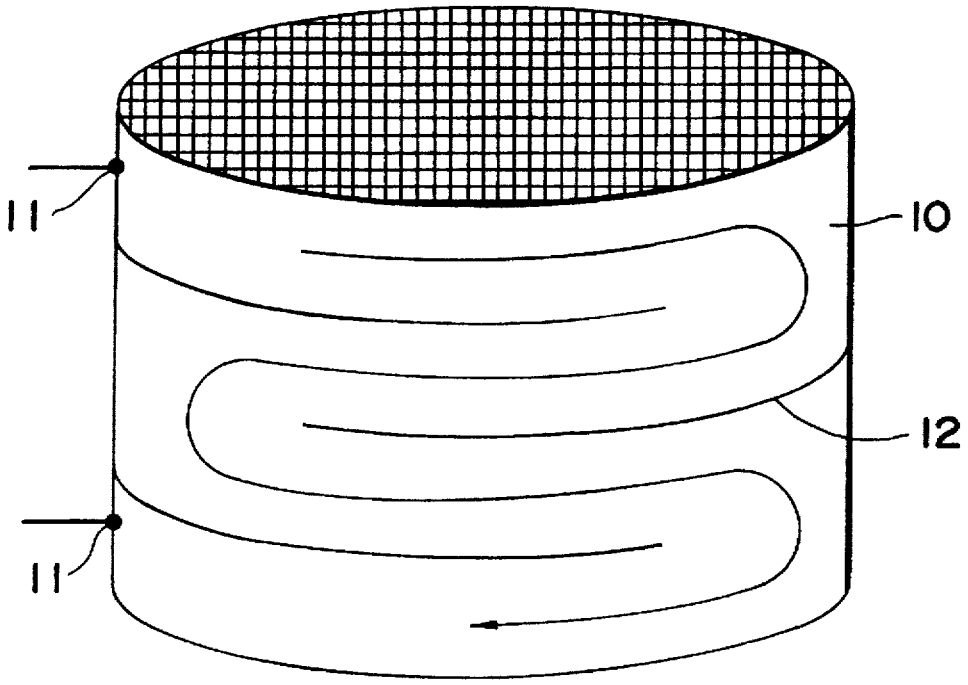

Three slits 12 were formed in the honeycomb structure obtained in the same manner as that of Example 1 in a direction perpendicular to the axial direction of the passages (in the radial direction), as shown in FIG, 3. The slits 12 were separated from each other by 5 mm, and had a length of 70 mm. The electrodes 11 were provided on the upper and lower end portions of the outer wall 10 of the honeycomb structure, as shown in FIG. 3.

EXAMPLE 5

Figure 4:
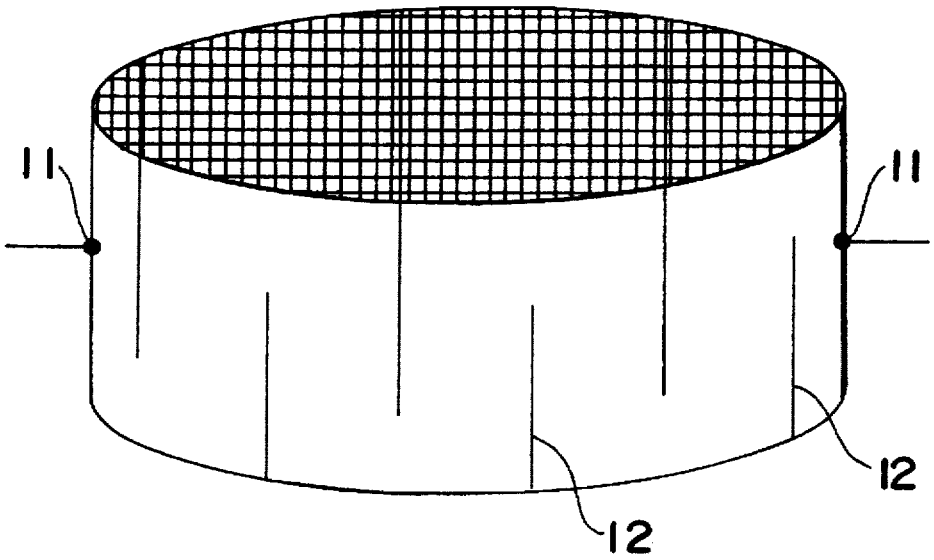

Six slits 12 (three slits in the upper portion and three slits in the lower portion) were formed in the honeycomb structure obtained in the same manner as that of Example 1 in the axial direction of the passages at intervals of seven cells (about 10 mm), as shown in FIG. 4. The slit depth was 10 mm. The electrodes 11 were provided on the honeycomb structure in the same manner as that of Example 1.

EXAMPLE 6

Figure 5:
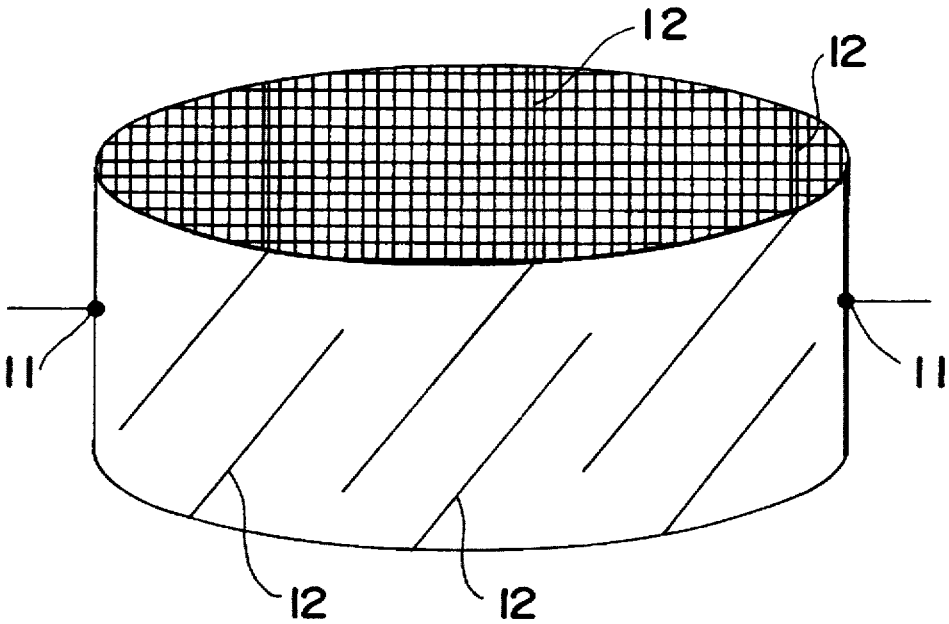

Six slits 12 (three slits in the upper portion and three slits in the lower portion) were formed in the honeycomb structure obtained in the same manner as that of Example 1 in such a manner that they were inclined at a predetermined angle with respect to the axis of the passage, as shown in FIG. 5. The slits 12 were separated from each other by seven cells (about 10 mm). The slit depth was 12 mm.

EXAMPLE 7

Figure 6A:
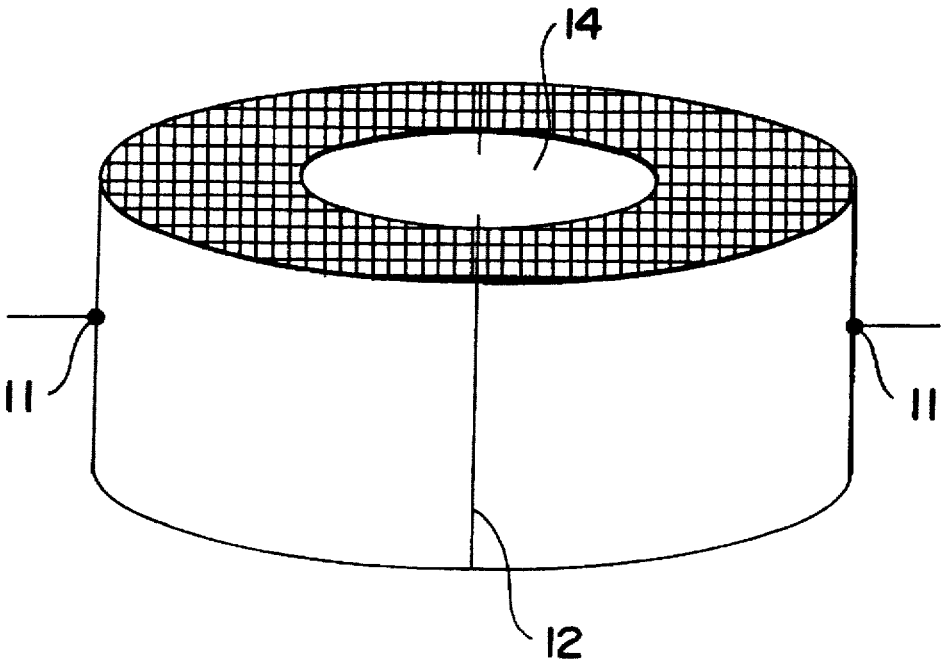
FIG. 6 is a view showing another example of the present invention, FIG. 6 (a) is a perspective view.
FIG. 6(b) is a side view and FIG. 6 (c) is a plan view.
Figure 6B:
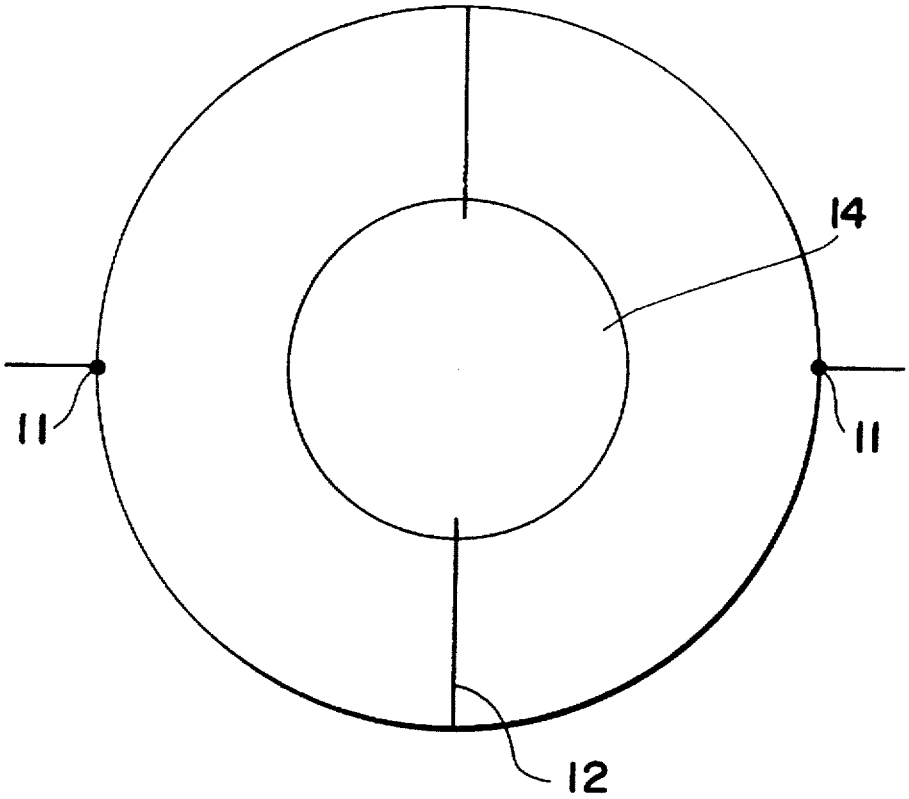
Figure 6C:
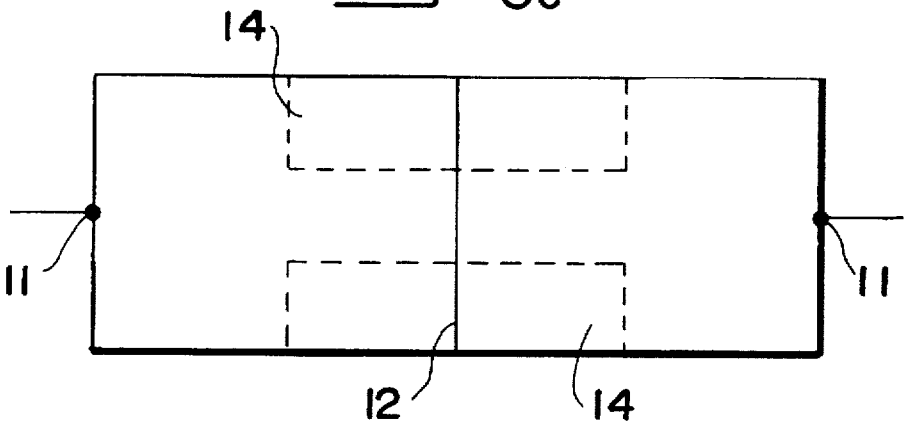

A recess 14, having a depth of 4 mm, was formed in the honeycomb structure obtained in the same manner as that of Example 1 at the central portion of 50 mmϕ at each end portion thereof, as shown in FIGS. 6 (a) and (b), and two slits 12 were then formed, as shown in FIG. 6 (c). Thereafter, the electrodes 11 were provided on the honeycomb structure in the same manner as that of Example 1.

EXAMPLE 8

Figure 7A:
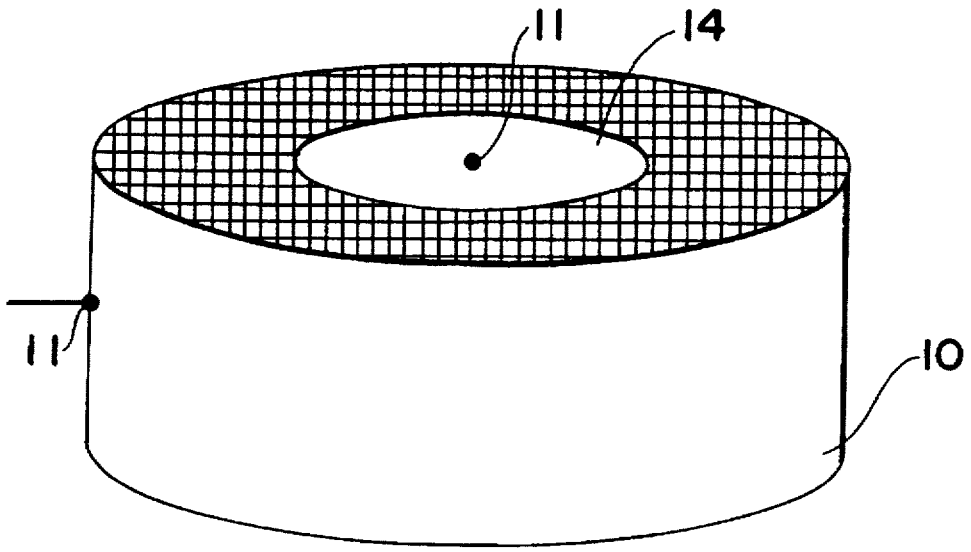
FIG. 7 is a view showing a further example of the present invention, FIG. 7 (a) is a perspective view and FIG. 7 (b) is a side view.
Figure 7B:
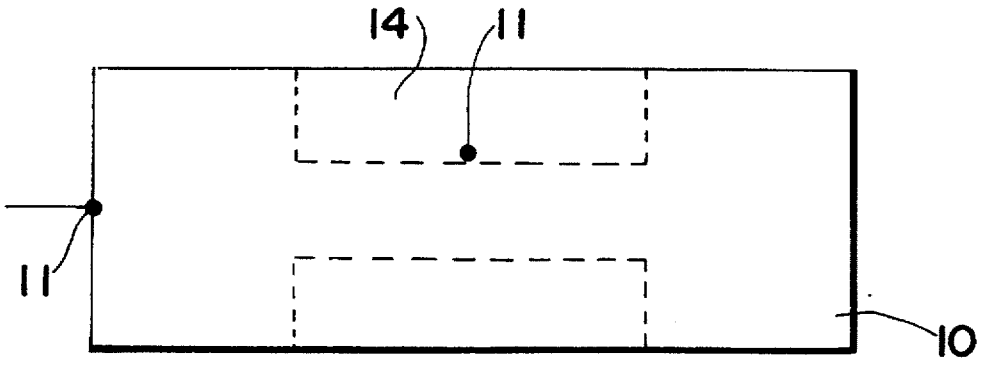

A recess 14, having a depth of 4 mm, was formed in the honeycomb structure obtained in the same manner as that of Example 1 at the central portion of 50 mmϕ at each end portion thereof, as shown in FIGS. 7 (a) and (b), and the two electrodes 11 were provided at the central portion of one of the recesses 14 and the outer wall 10 of the honeycomb structure, respectively.

EXAMPLE 9

Figure 8A:
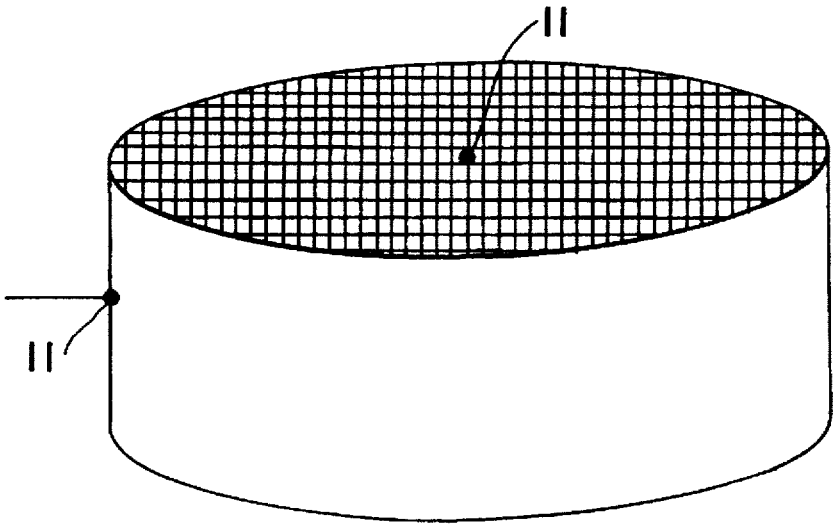
FIG. 8 is a view showing a still further example of the present invention, FIG. 8 (a) is a perspective view, and FIG. 8 (b) and (c) are partly enlarged views of passages of the honeycomb structure shown in FIG. 8 (a)
Figure 8B:
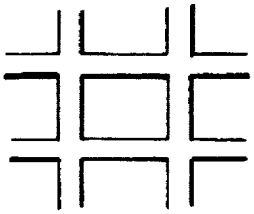
Figure 8C:
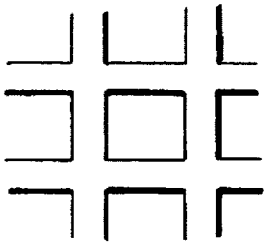

As shown in FIGS. 8 (a), (b) and (c), a honeycomb structure was obtained in the same manner as that of Example 1 with the exception that the wall thickness of the outer peripheral portion thereof was made thicker than that of the central portion [the thickness of the wall of the outer peripheral portion (see FIG. 8 (c)): 100 μm, the thickness of the wall of the central portion (see FIG. 8 (b)); 75 μm].

Such a honeycomb structure can easily be manufactured using an extrusion die. Thereafter, two electrodes 11 were provided on the central axis and the outer wall 10, respectively.

EXAMPLE 10

Figure 9:
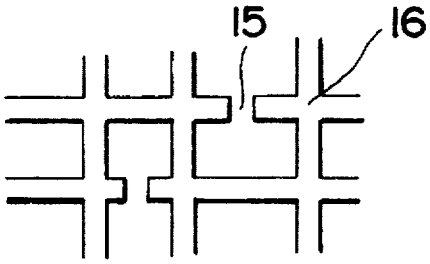
FIG. 9 is a partly enlarged view of passages of another type of honeycomb structure of the present invention.

Slits 15 were adequately formed in ribs 16 of the central portion of the honeycomb structure obtained in Example 9 to control heat generation characteristics thereof, as shown in FIG. 9. Such a honeycomb structure can also be easily manufactured using an extrusion die.

COMPARATIVE EXAMPLE 1

Electrodes were provided, in the same manner as that of Example 1, on the honeycomb structure, having an outer diameter of 90 mmϕ and a length of 15 mm, obtained in Example 1. This honeycomb structure had no slits.

[Evaluation]

(Checking of performance of a preheater for use in automobile exhaust emission control)

In order to check the performance of a catalytic converter employing a three-way catalyst which was on sale when an engine was started, the conversion of the gas components of an exhaust was measured by introducing the exhaust into that catalytic converter in such a manner that the temperature of the inlet of the catalyst rose from 100° C. to 420° C. in two minutes (at a fixed speed and then that temperature was then maintained at 420° C. for 1 minute (data without heater).

Thereafter, each of the samples of the Examples of the present invention was provided in front of the three-way catalyst as a preheater, and the conversion provided by that catalytic converter was measured in the same manner by introducing the exhaust thereinto while energizing the preheater.

The preheater was used in a state in which it was energized for 1 minute by a battery of 12 V. Table 1 shows the average conversion of the conversions obtained in three minutes for each of the gas components.

TABLE 1

| | Average Conversion (%) | | |
|---|---|---|---|
| Sample | CO | HC | $NO_x$ |
| Without heater | 50 | 37 | 47 |
| Example 1 | 64 | 50 | 65 |
| Example 2 | 70 | 55 | 68 |
| Example 3 | 63 | 50 | 63 |
| Example 4 | 63 | 51 | 64 |
| Example 5 | 64 | 50 | 65 |
| Example 6 | 63 | 48 | 61 |
| Example 7 | 64 | 51 | 66 |
| Example 8 | 63 | 50 | 64 |
| Example 9 | 65 | 52 | 67 |
| Comparative Example 1 | 58 | 44 | 55 |

As will be understood, according to the present invention, a resistance adjusting type heater, exhibiting excellent durability and temperature rising characteristics and uniform heat generation characteristics and capable of controlling the heat generation characteristics, can be provided. Also, a catalytic converter, exhibiting the above-described characteristics and improved exhaust conversion performance, is provided.

What is claimed is:

1. *171 An A* heating element for heating fluid flowing therethrough, comprising:

an electrically conductive [integral] *monolithic* honeycomb structure having a periphery and two ends, including a plurality of passages which are defined by partition walls and extend in an axial direction between the ends, and at least one slit which is formed through said partition walls, *said slit being open and unfilled in the area through which a fluid stream may pass through the honeycomb structure, and being substantially planar and extending substantially through the axial length of said honeycomb structure and substantially parallel to said axial direction and crossing the planes of a plurality of partition walls of the honeycomb structure*; and at least two electrodes in electrical contact with said honeycomb structure;

wherein said slit is disposed between said electrodes such that said slit interrupts current flow through portions of said honeycomb structure between said electrodes for heating said honeycomb structure and fluid flowing through said passages.

2. The heating element of claim 1, wherein said slit pierces the periphery of said honeycomb structure.

3. The heating element of claim 1, wherein said electrodes are located on the periphery of said honeycomb structure.

4. The heating element of claim 1, wherein said electrodes are located in opposition to each other across a volume of said honeycomb structure, in a direction which is generally transverse to said axial direction.

5. The heating element of claim 4, wherein said slit is arranged at an angle *with respect* to said axial direction.

[6. The heating element of claim 4, wherein said slit is arranged perpendicular to said axial direction.]

7. The heating element of claim 1, wherein the member of passages per unit area in a plane crossing said axial direction is non-uniform, for interrupting current flow between said electrodes.

8. The heating element of claim 1, further comprising a catalyst material formed on said partition walls.

9. The heating element of claim 1, wherein said slit is arranged parallel to said axial direction.

10. The heating element of claim [9] *1*, wherein the thickness of said partition walls is non-uniform for interrupting current flow between said electrodes.

11. The heating element of claim [9] *1*, wherein the lengths of said partition walls are non-uniform in said axial direction for interrupting current flow between said electrodes.

[12. The heating element of claim 11, wherein one of said electrodes is located at one of the ends and another of said electrodes is located at the periphery of said honeycomb structure.]

13. The heating element of claim 1, wherein there are a plurality of slits which are parallel to each other [through said partition walls].

14. A catalytic converter [disposed] *for disposal* in a stream of fluid, comprising:

(i) at least one main monolithic catalyst; and (ii) [an] *a* heating element disposed adjacent to said at least one main monolithic catalyst [in the flow direction of said stream of fluid], comprising:

an electrically conductive [integral] *monolithic* honeycomb structure having a periphery and two ends, including a plurality of passages which are defined by partition walls and extend in an axial direction between the ends, and at least one slit which is formed through said partition walls, *said slit being open and unfilled in the area through which a fluid stream may pass through the honeycomb structure, and being substantially planar and extending substantially through the axial length of said honeycomb structure and substantially parallel to said axial direction and crossing the planes of a plurality of partition walls of the honeycomb structure;* and at least two electrodes in electrical contact with said honeycomb structure;

wherein said slit is disposed between said electrodes such that said slit interrupts current flow through portions of said honeycomb structure between said electrodes for heating said honeycomb structures and fluid flowing through said passages.

15. The catalytic converter of claim 14, further comprising a catalyst material formed on said partition walls.

16. The catalytic converter of claim 14, wherein said heating element is disposed upstream of said main monolithic catalyst [with respect to the flow direction of said fluid].

* * * * *